(12) United States Patent
Son et al.

(10) Patent No.: US 11,803,242 B2
(45) Date of Patent: Oct. 31, 2023

(54) SYSTEM FOR CONTROLLING A VEHICLE DISPLAY

(71) Applicant: HYUNDAI MOBIS CO., LTD., Seoul (KR)

(72) Inventors: Ho Won Son, Yongin-si (KR); Hae Ri Kang, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/811,539

(22) Filed: Jul. 8, 2022

(65) Prior Publication Data

US 2023/0034240 A1 Feb. 2, 2023

(30) Foreign Application Priority Data

Aug. 2, 2021 (KR) .................. 10-2021-0101615

(51) Int. Cl.
| | |
|---|---|
| *G06F 3/01* | (2006.01) |
| *G06F 3/042* | (2006.01) |
| *G06F 3/041* | (2006.01) |
| *G02F 1/1333* | (2006.01) |
| *B60K 35/00* | (2006.01) |

(52) U.S. Cl.
CPC .......... *G06F 3/016* (2013.01); *G02F 1/13338* (2013.01); *G02F 1/133314* (2021.01); *G02F 1/133331* (2021.01); *G06F 3/0414* (2013.01); *G06F 3/0421* (2013.01); *B60K 35/00* (2013.01); *B60K 2370/1438* (2019.05); *B60K 2370/158* (2019.05); *B60K 2370/164* (2019.05); *G02F 2202/28* (2013.01)

(58) Field of Classification Search
CPC ........................ G06F 3/016; G02F 1/133331
See application file for complete search history.

(56) References Cited

U.S. PATENT DOCUMENTS

| | | | |
|---|---|---|---|
| 10,504,342 B1 * | 12/2019 | Khoshkava | .............. G08B 6/00 |
| 11,016,560 B1 * | 5/2021 | Wenger | ................... G06F 3/011 |
| 2011/0141389 A1 * | 6/2011 | Tabor | ................ G02F 1/133615 |
| | | | 349/58 |

(Continued)

FOREIGN PATENT DOCUMENTS

| | | |
|---|---|---|
| KR | 2011-0094722 | 8/2011 |
| KR | 2012-0139958 | 12/2012 |
| KR | 2015-0043138 | 4/2015 |

OTHER PUBLICATIONS

English Language Abstract of KR 2011-0094722 published Aug. 24, 2011.

(Continued)

*Primary Examiner* — Chun-Nan Lin
(74) *Attorney, Agent, or Firm* — DLA PIPER LLP (US)

(57) ABSTRACT

A vehicle display control device including a housing that constitutes a body and is fixed to an instrument panel, an LCD cover whose outer circumference surface is disposed to be spaced apart from an inner circumference surface of the housing and that is accommodated in the housing, an LCD module that is accommodated in the LCD cover and covered by the LCD cover, a haptic actuator that is mounted on a rear of the LCD cover and transfers vibration to the LCD cover, and a support member that is disposed between the LCD cover and the housing.

19 Claims, 6 Drawing Sheets

(56) References Cited

U.S. PATENT DOCUMENTS

| | | | | |
|---|---|---|---|---|
| 2018/0329493 | A1* | 11/2018 | Khoshkava | H01L 41/09 |
| 2020/0257308 | A1* | 8/2020 | Herman | G05D 1/0255 |
| 2022/0410709 | A1* | 12/2022 | Florentz | B60K 35/00 |

OTHER PUBLICATIONS

English Language Abstract of KR 2012-0139958 published Dec. 28, 2012.

English Language Abstract of KR 2015-0043138 published Apr. 22, 2015.

* cited by examiner

SYSTEM FOR CONTROLLING A VEHICLE DISPLAY

This application claims benefit of priority to Korean Patent Application No. 10-2021-0101615, filed on Aug. 2, 2021, the disclosure of which is incorporated herein by reference in its entirety.

BACKGROUND

Technical Field

The present disclosure relates to a display control device, and more particularly, to a vehicle display control device.

Related Art

A vehicle display device refers to an audio-visual system for a vehicle equipped with an image system such as TV and video as well as a car audio system inside the vehicle.

The vehicle display device is installed on an instrument panel provided next to the driver's seat to provide convenience to passengers in the vehicle. In recent years, with the development of autonomous driving performance and electronic technology, the vehicle display device is increasing quantitatively and qualitatively.

In particular, the vehicle display device is gradually becoming larger, higher resolution, and diversified, and it is a common market trend that this trend will be accelerated.

In addition, a touch haptic device has been proposed as a vehicle display control device.

However, the vehicle display device in the prior art has a limit in the understanding of the user's intention, i.e., the amount of force or pressure, so an error such as the execution of an application that does not reflect the user's intention has occurred.

For example, there is a problem in that an unwanted application is executed by touching an LCD module due to the user's carelessness or mistake.

In addition, when a driver or a passenger touches the display device equipped with the haptic device, vibration is generated in the LCD module for a luxurious feeling.

However, in general, the LCD module is firmly fixed to the vehicle to prevent it from being separated from an instrument panel while the vehicle is driven.

Accordingly, the LCD module has a problem in that the intensity of touch vibration generated when the driver or the passenger touches it is weak, or the touch vibration is transferred to the instrument panel of the vehicle and noise occurs in the instrument panel.

For the above-described reasons, in the relevant field, when the driver or the passenger operates the display device, a way to precisely execute a desired application and clearly transfer touch vibration to the LCD module is being sought. However, satisfactory results have not been obtained up to now.

SUMMARY

Various embodiments are directed to a vehicle display control device which can precisely execute a desired application and clearly transfer touch vibration to an LCD module when a driver or a passenger operates a display device.

The above-described and other objects, advantages and features of the present disclosure, and a method of achieving them will become apparent with reference to embodiments described below in detail in conjunction with the accompanying drawings.

In an embodiment, a vehicle display control device includes: a housing that constitutes a body and is fixed to an instrument panel; an LCD cover whose outer circumference surface is disposed to be spaced apart from an inner circumference surface of the housing and that is accommodated in the housing; an LCD module that is accommodated in the LCD cover and covered by the LCD cover; a haptic actuator that is mounted on a rear of the LCD cover and transfers vibration to the LCD cover; and a support member that is disposed between the LCD cover and the housing.

The LCD cover is accommodated inside the housing in a direction in which the rear of the LCD cover and a bottom surface of the housing face each other.

The LCD module includes: a cover glass that is disposed on a front of the LCD cover; a touch unit that selectively controls a display device through a driver's or passenger's touch; a display unit that is disposed on a rear of the touch unit, receives an output signal from the outside and outputs various types of information; and a backlight unit that is disposed on a rear of the display unit, uniformly controls the amount of light transmitted from the outside and transfers the transmitted light to the display unit.

The touch unit consists of indium tin oxide (ITO).

The touch unit includes: an actuator film that is disposed on a rear of the cover glass; and an adhesive member that adheres to each of one side and the other side of the actuator film so as to enable the cover glass to adhere to the one side of the actuator film and the display unit to adhere to the other side of the actuator film.

When a driver or a passenger presses the cover glass, a voltage is generated in the actuator film by a piezoelectric effect.

An area of the adhesive member is the same as an area of the actuator film.

The adhesive member consists of an optically clear adhesive (OCA).

In an embodiment, a vehicle display control device includes: a housing that constitutes a body and is fixed to an instrument panel; an LCD cover whose outer circumference surface is disposed to be spaced apart from an inner circumference surface of the housing and that is accommodated in the housing; an LCD module that is accommodated in the LCD cover and covered by the LCD cover; a haptic actuator that is mounted on a rear of the LCD cover and transfers vibration to the LCD cover; a support member that is disposed between the LCD cover and the housing; and a sensing part that is mounted on each of the rear of the LCD cover and a bottom surface of the housing and senses a degree of pressurization of the LCD module.

The LCD module includes: a touch unit that selectively controls a display device through a driver's or passenger's touch; and a display unit that is disposed on a rear of the touch unit, receives an output signal from the outside and outputs various types of information, wherein the sensing part calculates the degree of pressurization of the LCD module when a driver or a passenger presses the touch unit.

The sensing part includes: a plurality of reflecting plates that are mounted on the rear of the LCD cover; and a plurality of sensor members that are mounted on the bottom surface of the housing and disposed at positions corresponding to the reflecting plates.

The sensor members emit infrared rays toward the reflecting plates, and the reflecting plates reflect the infrared rays, which are emitted from the sensor members, to the sensor members.

The sensing part calculates a distance between the LCD cover on which the reflecting plates are mounted and the sensor members by calculating a time for the infrared rays, which are emitted from the sensor members, to be reflected from the reflecting plates and return to the sensor members.

When the driver or the passenger touches the touch unit with a predetermined pressure or less, corresponding information is not outputted by the display unit, and when the driver or the passenger touches the touch unit with the predetermined pressure or more, the corresponding information is outputted by the display unit.

The reflecting plates have white uniform surfaces.

In an embodiment, a vehicle display control device includes: a housing that constitutes a body and is fixed to an instrument panel; an LCD cover whose outer circumference surface is disposed to be spaced apart from an inner circumference surface of the housing and that is accommodated in the housing; an LCD module that is accommodated in the LCD cover and covered by the LCD cover; a haptic actuator that is mounted on a rear of the LCD cover and transfers vibration to the LCD cover; and a support member that is disposed between the LCD cover and the housing, wherein the LCD module includes: a touch unit that selectively controls a display device through a driver's or passenger's touch; and a display unit that is disposed on a rear of the touch unit, receives an output signal from the outside and outputs various types of information.

The haptic actuator is electrically connected to the touch unit, and when the touch unit is touched, a touch signal generated from the touch unit is transferred to the haptic actuator.

The haptic actuator generates vibration when a driver or a passenger touches or presses the touch unit.

The support member is disposed between the rear of the LCD cover and a bottom surface of the housing so that the LCD cover is disposed to be spaced apart from the housing.

In accordance with the embodiments of the present disclosure, a space between a cover glass and an actuator film is deleted. Accordingly, when external light, for example, sunlight, passing through the cover glass passes through the cover glass and then contacts a touch unit, it is possible to effectively block the loss of a content image of a display unit, which is outputted according to a driver's or passenger's operation, due to light scattering and bending, thereby increasing the visibility of the display unit.

Furthermore, in an LCD module, when the driver or the passenger touches a touch unit with a predetermined pressure or less so that the touch unit is pressed by a distance shorter than a predetermined distance, corresponding information is not outputted by the display unit, and when the driver or the passenger touches the touch unit with the predetermined pressure or more so that the touch unit is pressed by the predetermined distance, the corresponding information is outputted by the display unit. Accordingly, it is possible to effectively prevent the output of undesired information even when the LCD module is touched due to carelessness or mistake of the driver or the passenger while a vehicle is driven.

Furthermore, as an LCD cover constituting floating parts is spaced apart by support members from a housing constituting fixed parts, haptic actuators can vibrate without a collision between an outer circumference surface of the LCD cover and an inner circumference surface of the housing.

Accordingly, when the driver or the passenger touches the display device, vibration loss occurring when the outer circumference surface of the LCD cover collides with the inner circumference surface of the housing can be minimized, and thus the vibration of the haptic actuators can be clearly transferred to the driver's or passenger's finger.

DETAILED DESCRIPTION

Figure 1:
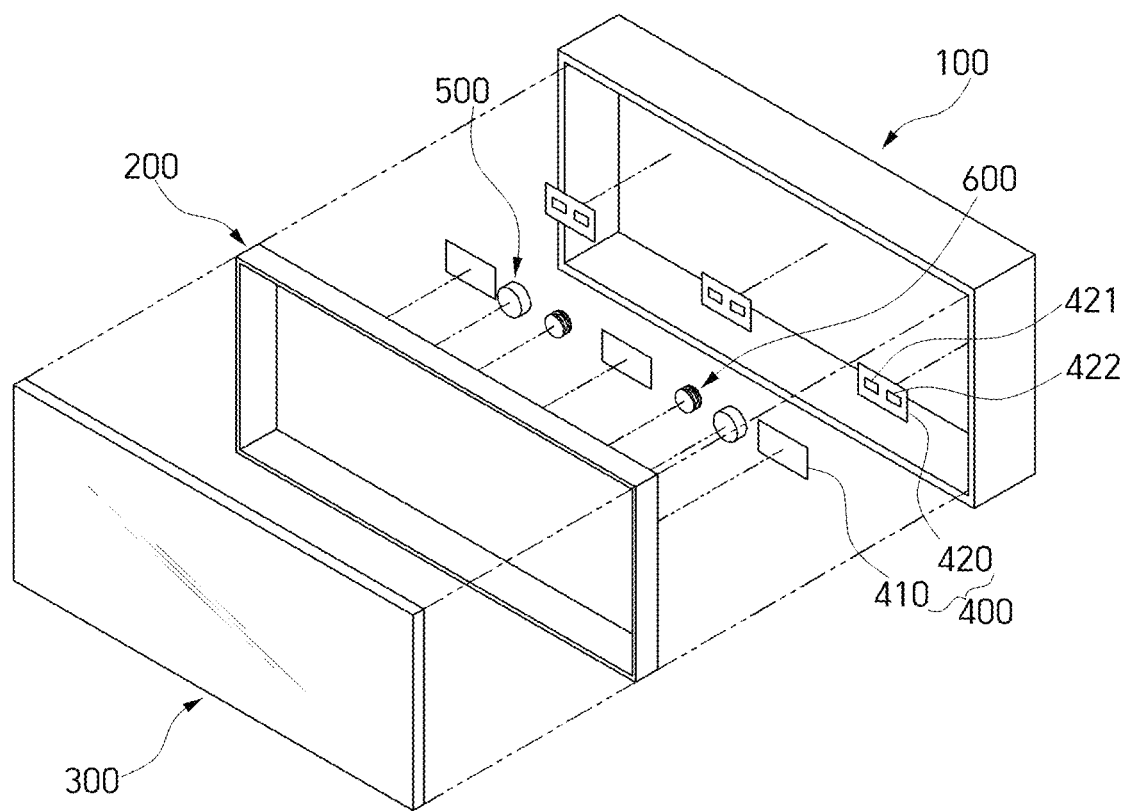
FIG. 1 is an exploded perspective view illustrating a vehicle display control device in accordance with an embodiment of the present disclosure.

The advantages and characteristics of the present disclosure and a method for achieving the advantages and characteristics will be clearly understood through embodiments to be described below in detail with reference to the accompanying drawings. However, the present disclosure are not limited by the embodiments disclosed below, and may be embodied in various different forms. These embodiments are provided to make this disclosure thorough and complete and to fully convey the scope of the present disclosure to those skilled in the art to which the present disclosure pertains. In addition, in the following drawings, each component is exaggerated for convenience and clarity of description, and the same reference numerals in the drawings refer to the same elements. As used herein, the term "and/or" includes any one and all combinations of one or more of listed items.

Terms used in this specification are used for describing exemplary embodiments, not limiting the present disclosure.

As used in this specification, the terms of a singular form may include plural forms unless referred to the contrary. The term such as "comprise" or "comprising" used in the specification specifies the presence of recited shapes, numbers, steps, actions, members, elements, and/or groups thereof, but does not exclude the presence or addition of one or more other shapes, numbers, steps, actions, members, elements, and/or groups thereof.

Hereafter, exemplary embodiments of the present disclosure will be described in detail with reference to the accompanying drawings.

Figure 2:
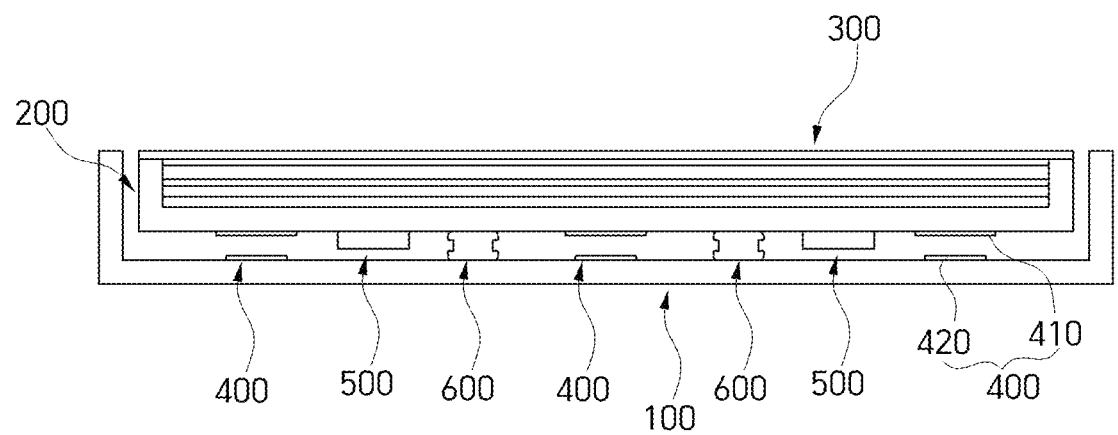
FIG. 2 is a cross-sectional view illustrating the vehicle display control device in accordance with the embodiment of the present disclosure.
Figure 3:
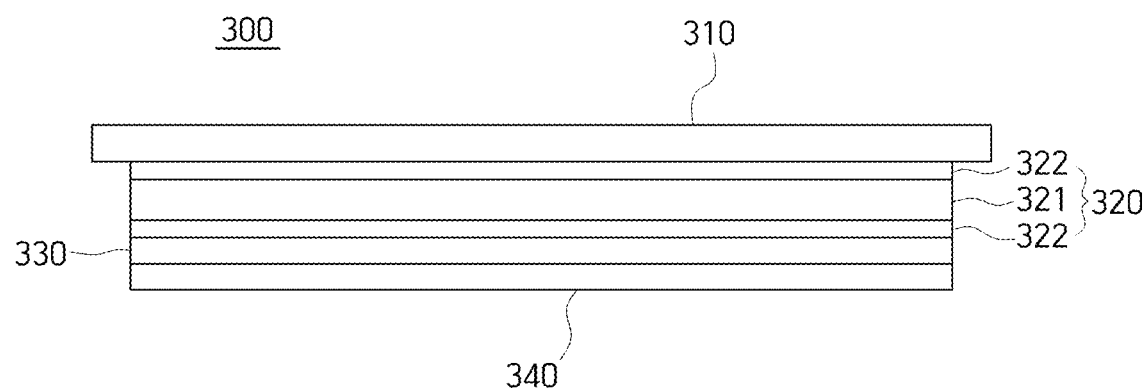
FIG. 3 is a cross-sectional view illustrating an LCD module in accordance with the embodiment of the present disclosure.
Figure 4:
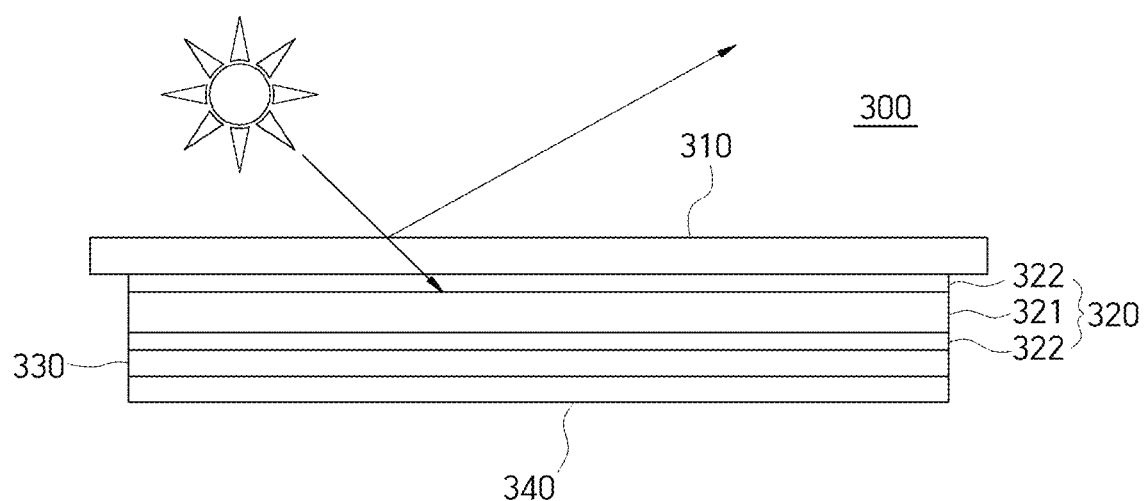
FIG. 4 is a reference view illustrating the LCD module in accordance with the embodiment of the present disclosure.
Figure 5:
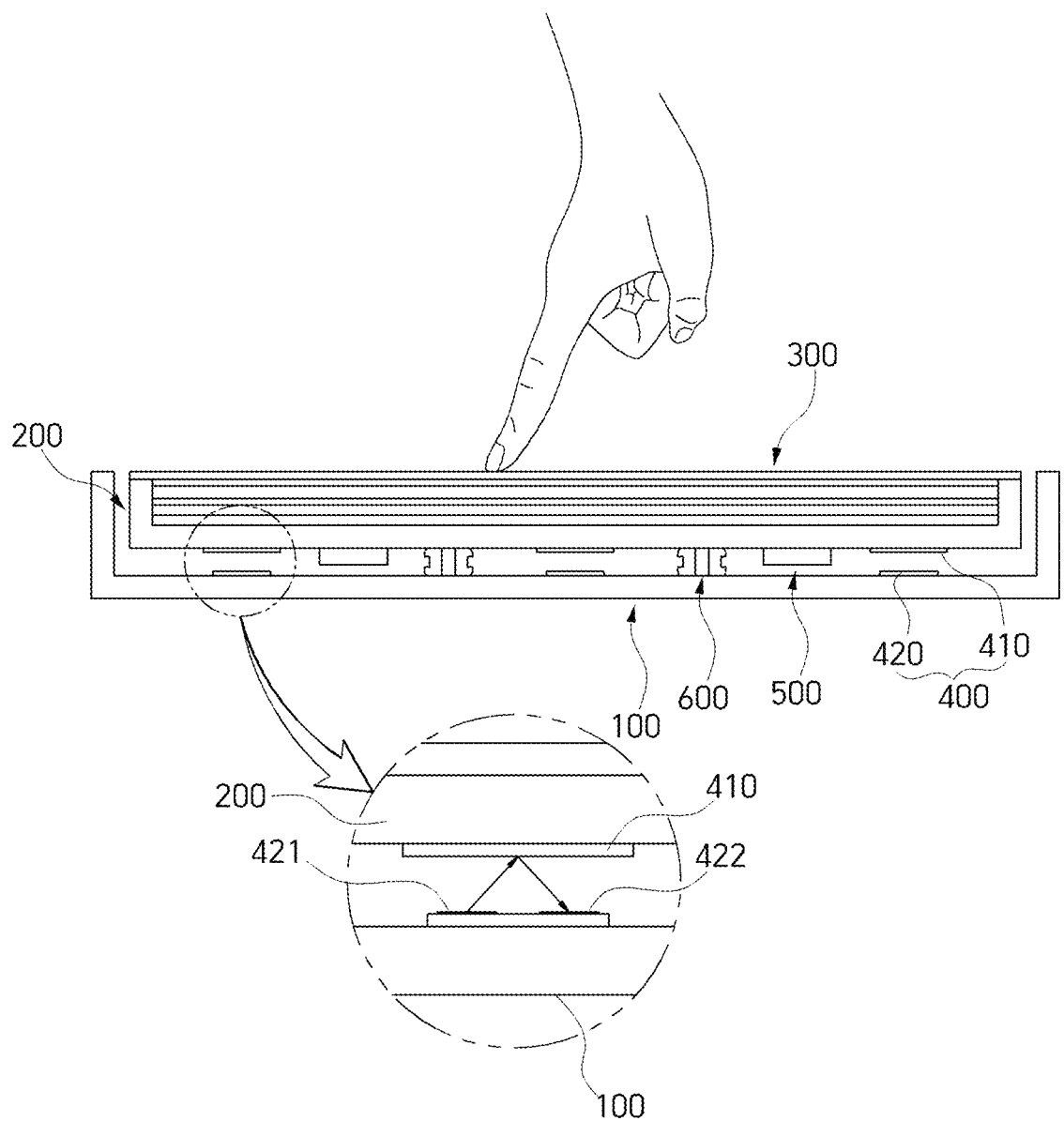
FIGS. 5 and 6 are operational diagrams illustrating a use state of a sensing part in accordance with the embodiment of the present disclosure.
Figure 6:
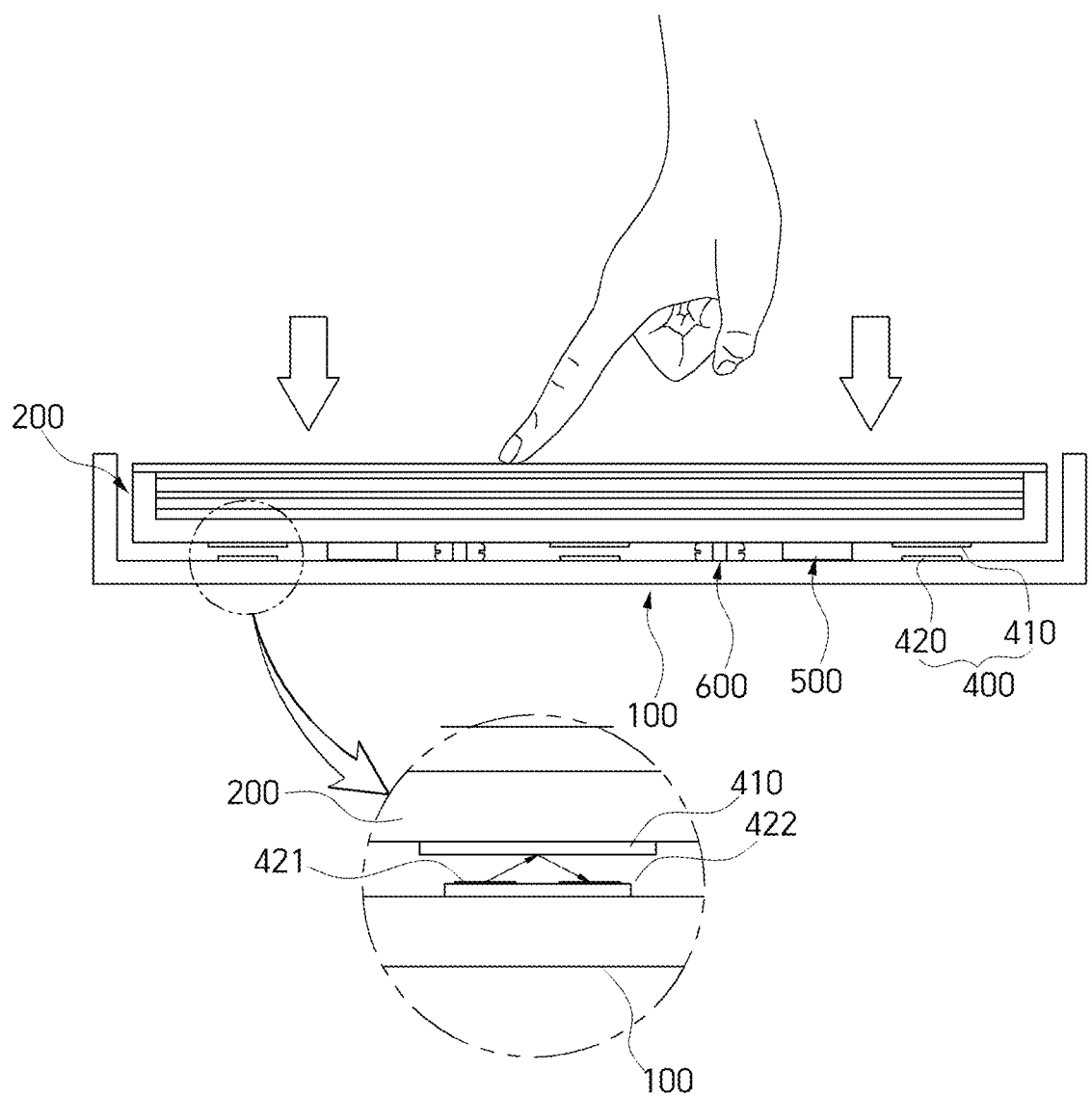
Figure 7:
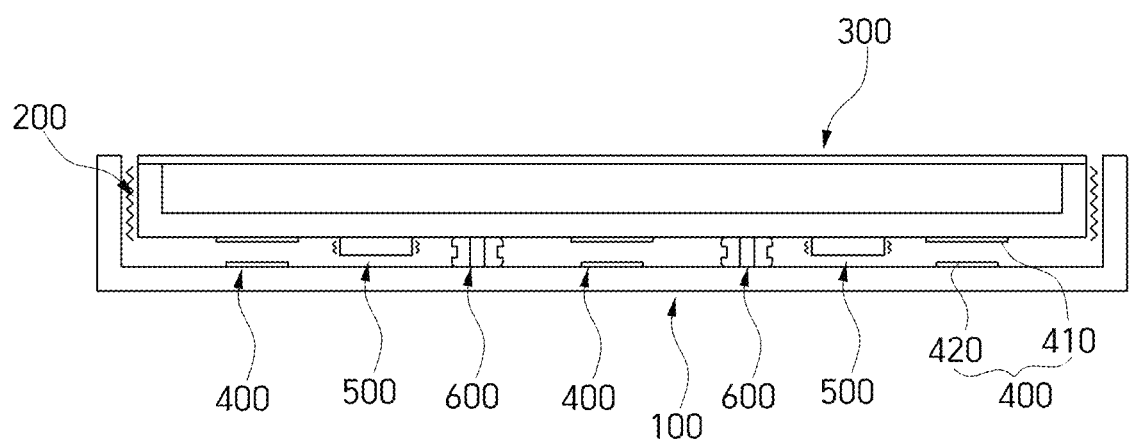
FIG. 7 is a cross-sectional view illustrating a use state of the vehicle display control device in accordance with the embodiment of the present disclosure.

FIG. 1 is an exploded perspective view illustrating a vehicle display control device in accordance with an embodiment of the present disclosure, FIG. 2 is a cross-sectional view illustrating the vehicle display control device in accordance with the embodiment of the present disclosure, FIG. 3 is a cross-sectional view illustrating an LCD module in accordance with the embodiment of the present disclosure, FIG. 4 is a reference view illustrating the LCD module in accordance with the embodiment of the present disclosure, FIGS. 5 and 6 are operational diagrams illustrating a use state of a sensing unit in accordance with the embodiment of the present disclosure, and FIG. 7 is a cross-sectional view illustrating a use state of the vehicle display control device in accordance with the embodiment of the present disclosure.

Referring to FIGS. 1 to 6, the vehicle display control device according to the embodiment of the present disclosure may be largely divided into floating parts and fixed parts.

The floating parts refer to configurations that are accommodated in the fixed parts, disposed to be spaced apart from the fixed parts and movable from the fixed parts.

The fixed parts refer to configurations are fixed to an instrument panel of a vehicle.

The vehicle display control device according to the embodiment of the present disclosure includes a housing 100, an LCD cover 200, an LCD module 300, a sensing part 400, haptic actuators 500 and support members 600.

The housing 100 constitutes a body, and is fixed to the instrument panel of the vehicle.

That is, the housing 100 corresponds to the fixed parts that is fixed to the instrument panel of the vehicle and does not move among the floating parts and the fixed parts.

The housing 100 has a front, which is in a vehicle interior direction and communicates with the outside, and a rear, which is in an opposite direction of the vehicle interior direction and is sealed.

In addition, various electronic components for controlling a display device are accommodated in the housing 100 through the front of the housing 100.

The LCD cover 200 is accommodated in the housing 100, and has an outer circumference surface spaced apart from an inner circumference surface of the housing 100.

That is, the LCD cover 200 corresponds to the floating parts movable from the housing 100 among the floating parts and the fixed parts.

The LCD cover 200 has a front, which is in the vehicle interior direction and communicates with the outside, and a rear, which is in the opposite direction of the vehicle interior direction and is sealed.

In addition, the rear of the LCD cover 200 is accommodated to face the rear of the housing 100.

That is, the LCD cover 200 is accommodated in the housing 100 in a direction in which the rear of the LCD cover 200 and a bottom surface of the housing 100 face each other.

The LCD module 300 is accommodated in the LCD cover 200, and is covered by the LCD cover 200.

In addition, the LCD module 300 outputs a corresponding content according to the operation of a driver or a passenger.

The LCD module 300 includes a cover glass 310, a touch unit 320, a display unit 330 and a backlight unit 340 as illustrated in FIG. 3.

The cover glass 310 is disposed on a front of the LCD cover 200 in the vehicle interior direction.

The cover glass 310 protects the display unit 330, the touch unit 320 and the backlight unit 340, which are accommodated in the LCD cover 200, from external forces.

The touch unit 320 is disposed on a rear of the cover glass 310, and when the driver or the passenger touches the touch unit 320, volume of an AV system such as an audio or a CD player mounted on a center fascia inside the vehicle, power on/off and frequency tuning are controlled, and cooling and heating of an air conditioning system are also controlled so that the vehicle is able to be driven in a pleasant state.

The touch unit 320 is preferably coated with indium tin oxide (ITO).

The ITO enables the display device to be operated only by the driver's or passenger's finger touch, and when the cover glass 310 is touched or pressed within an operation range, a command corresponding to a key is executed by the display device.

That is, the touch unit 320 coated with the ITO determines whether there is a touch input to the cover glass 310, and detects an input coordinate.

The touch unit 320 includes an actuator film 321 and adhesive members 322.

The actuator film 321 is disposed on the rear of the cover glass 310, and may consist of a piezoelectric element or a piezoelectric actuator that includes a piezoelectric material having a piezoelectric effect in which a voltage is generated when a mechanical pressure is applied, and a reverse piezoelectric effect in which mechanical deformation occurs when a voltage is applied.

When the driver or the passenger applies pressure to the cover glass 310, the pressure may be applied to the actuator film 321.

For example, when the driver or the passenger applies the pressure to the cover glass 310, a voltage is generated in the actuator film 321 by the piezoelectric effect.

In addition, when the actuator film 321 generates vibration due to the mechanical deformation according to the reverse piezoelectric effect, the vibration is transferred to the driver's or passenger's finger touching the cover glass 310.

For this reason, when the driver or the passenger touches the actuator film 321, a luxurious sensibility may be felt through haptics.

The adhesive members 322 is formed of a pair, and respectively adhere to both sides of the actuator film 321.

That is, the adhesive members 322 enable the cover glass 310 disposed ahead of the actuator film 321 and the display unit 330 disposed on a rear of the actuator film 321 to adhere to the front and rear of the actuator film 321, respectively.

In addition, the areas of the adhesive members 322 are the same as the area of the actuator film 321.

That is, a space between the cover glass 310 and the actuator film 321 is deleted.

Accordingly, as illustrated in FIG. 4, when external light, for example, sunlight, passing through the cover glass 310 passes through the cover glass 310 and contacts the touch unit 320, it is possible to effectively block the loss of a content image of the display unit 330, which is outputted according to the driver's or passenger's operation, due to light scattering and bending, thereby increasing the visibility of the display unit 330.

Each of the adhesive members 322 preferably consists of an optically clear adhesive (OCA).

The OCA is an optically clear adhesive, and is in the form of a film like a double-sided tape.

Furthermore, the OCA transmits approximately 97% or more of light and functions as glass.

Accordingly, the OCA may firmly attach the cover glass 310 and the display unit 330 to the actuator film 321, and at the same time, may allow information to be clearly outputted from the display unit 330.

It has been described that the adhesive members 322 consist of the OCA in the form of a film such as a double-sided tape, but if the adhesive members 322 enable the cover glass 310 and the display unit 330 to adhere to the actuator film 321, and can transmit light, the adhesive members 322 may also consist of a liquid optically clear resin (OCR).

The display unit 330 is accommodated in the LCD cover 200, and adheres to the actuator film 321 through the adhesive member 322 consisting of the OCA.

In addition, the display unit 330 receives an output signal from the outside to output various types of information, and is an output unit that displays information related to the display device so that the driver can visually and easily recognize required information.

The backlight unit 340 is accommodated in the LCD cover 200, is disposed on a rear of the display unit 330, and is mounted on a bottom surface of the LCD cover 200.

In addition, the backlight unit 340 is a dimming device that transmits light to the display unit 330 by constantly adjusting the amount of transmitted light.

The cover glass 310, the touch unit 320, the display unit 330 and the backlight unit 340 constituting the LCD module 300 are accommodated in the LCD cover 200, and correspond to the floating parts among the floating parts and the fixed parts.

Accordingly, the LCD module 300 may move from the housing 100 by the LCD cover 200.

The sensing part 400 is mounted on the rear of the LCD cover 200 and the bottom surface of the housing 100, and calculates the degree of pressurization of the LCD module 300 by using infrared rays when the driver or the passenger presses the touch unit 320.

In addition, the number of the sensing parts 400 and the size of the sensing part 400 may vary depending on the size of the display device.

The sensing part 400 includes reflecting plates 410 and sensor members 420.

The reflecting plates 410 are provided in plural, and are mounted on the rear of the LCD cover 200.

That is, the reflecting plates 410 are mounted on the LCD cover 200 constituting the floating parts, and may move from the housing 100.

In addition, the reflecting plates 410 serve to reflect the infrared rays, which are emitted from the sensor members 420, back to the sensor members 420.

The reflecting plates 410 are formed in white, and have uniform surfaces.

Accordingly, when the reflecting plates 410 reflect the infrared rays emitted from the sensor members 420, the infrared rays are clearly reflected so that the reflecting plates 410 may extract an accurate value of a distance between the LCD module 300 and the sensor members 420.

The sensor members 420 are mounted on the bottom surface of the housing 100, and are disposed at positions corresponding to the reflecting plates 410.

That is, the sensor members 420 emit the infrared rays to the reflecting plates 410, calculate time required for infrared rays to return from the reflecting plates 410, and calculate the distance between the LCD module 300 and the sensor members 420.

Each of the sensor members 420 includes an emitter 421 and a sensing unit 422.

The emitter 421 emits the infrared rays to the reflecting plate 410 mounted on the rear of the LCD cover 200, and the sensing unit 422 receives the infrared rays, which are emitted from the emitter 421 and then are reflected by the reflecting plate 410.

Meanwhile, in the LCD module 300, when the driver or the passenger touches the touch unit 320 with a predetermined pressure or less so that the touch unit 320 is pressed by a distance shorter than a predetermined distance, the corresponding information is not outputted to the display unit 330, and when the driver or the passenger touches the touch unit 320 with the predetermined pressure or more so that the touch unit 320 is pressed by the predetermined distance, the corresponding information is outputted to the display unit 330.

For example, as illustrated in FIG. 5, the corresponding information is not outputted by the display unit 330 when the distance between the LCD cover 200 and the sensor members 420 becomes approximately 1.98 mm as the driver or the passenger touches the touch unit 320 in a state where the distance between the LCD cover 200 on which the reflecting plates 410 are mounted and the sensor members 420 is approximately 2 mm.

As illustrated in FIG. 6, when the driver or the passenger intentionally presses the LCD module 300 with the predetermined pressure so that the distance between the LCD cover 200 and the sensor members 420 becomes approximately 1.95 mm, the corresponding information is outputted from the display unit 330.

Accordingly, it is possible to effectively prevent the output of undesired information even when the LCD module 300 is touched due to carelessness or mistake of the driver or passenger while the vehicle is driven.

The haptic actuators 500 are mounted on the rear of the LCD cover 200, and are electrically connected to the touch unit 320.

In addition, the haptic actuators 500 sense the driver's or passenger's finger touch and receive a touch signal.

Accordingly, the haptic actuators 500 generate vibration when the driver or the passenger touches or presses the touch unit 320 of the LCD module 300.

The support members 600 are disposed between the rear of the LCD cover 200 and the bottom surface of the housing 100 so that the LCD cover 200 is disposed to be spaced apart from the housing 100.

That is, as illustrated in FIG. 7, as the LCD cover 200 constituting the floating parts is spaced apart by the support members 600 from the housing 100 constituting the fixed parts, the haptic actuators 500 may vibrate without a collision between the outer circumference surface of the LCD cover 200 and the inner circumference surface of the housing 100.

Accordingly, when the driver or the passenger touches the display device, vibration loss occurring when the outer circumference surface of the LCD cover 200 collides with the inner circumference surface of the housing 100 is minimized, and thus the vibration of the haptic actuators 500 may be clearly transferred to the driver's or passenger's finger.

Each of the support members 600 may consist of a plurality of rubber dampers each formed of a cylindrical rubber material.

That is, since the rubber dampers are formed of the rubber material, the vibration generated from the LCD cover 200 may be lost due to the nature of the material, which makes it possible to effectively block the vibration from being transferred to the housing 100.

Accordingly, the support members 600 are coupled to the housing 100, which corresponds to the fixed parts, so that the loss of the vibration of the LCD cover 200 may be minimized by the housing 100.

Although it has been described in the present embodiment that the support members 600 consist of the rubber dampers formed of the rubber material, the support members 600 may have various structures such as a leaf spring if the support members 600 may prevent the vibration generated from the LCD cover 200 from being lost.

As described above, in the vehicle display control device of the present disclosure, the space between the cover glass 310 and the actuator film 321 is deleted. Accordingly, when external light, for example, sunlight, passing through the cover glass 310 passes through the cover glass 310 and then contacts the touch unit 320, it is possible to effectively block the loss of the content image of the display unit 330, which is outputted according to the driver's or passenger's operation, due to light scattering and bending, thereby increasing the visibility of the display unit 330.

In the LCD module 300, when the driver or the passenger touches the touch unit 320 with the predetermined pressure or less so that the touch unit 320 is pressed by a distance shorter than the predetermined distance, the corresponding information is not outputted, and when the driver or the passenger touches the touch unit 320 with the predetermined pressure or more so that the touch unit 320 is pressed by the predetermined distance, the corresponding information is outputted. Accordingly, it is possible to effectively prevent the output of undesired information even when the LCD module 300 is touched due to carelessness or mistake of the driver or the passenger while the vehicle is driven.

Moreover, as the LCD cover 200 constituting the floating parts is disposed to be spaced apart by the support members 600 from the housing 100 constituting the fixed parts, the haptic actuators 500 may vibrate without a collision between the outer circumference surface of the LCD cover 200 and the inner circumference surface of the housing 100.

Accordingly, when the driver or the passenger touches the display device, vibration loss occurring when the outer circumference surface of the LCD cover 200 collides with the inner circumference surface of the housing 100 may be minimized, and thus the vibration of the haptic actuators 500 may be clearly transferred to the driver's or passenger's finger.

As such, the embodiments disclosed in this specification should be considered from an illustrative point of view for description rather than a limitative point of view. The scope of the present disclosure is defined by the following claims rather than the above description, and all differences within the scope equivalent thereto should be construed as being included in the present disclosure.

What is claimed is:

1. A vehicle display control device comprising:
a housing comprising a body and being fixed to an instrument panel;
a liquid crystal display (LCD) cover whose outer circumference surface is spaced apart from an inner circumference surface of the housing and is within the housing;
an LCD module within the LCD cover and being covered by the LCD cover;
a haptic actuator mounted on a rear of the LCD cover and adapted to transfer vibration to the LCD cover; and
a support member disposed between the LCD cover and the housing.

2. The vehicle display control device of claim 1, wherein the LCD cover is inside the housing such that the rear of the LCD cover and a bottom surface of the housing face each other.

3. The vehicle display control device of claim 1, wherein the LCD module includes:
a cover glass on a front of the LCD cover;
a touch unit that selectively controls a display device through a driver's or passenger's touch;
a display unit on a rear of the touch unit adapted to receive an output signal from outside the LCD module and output various types of information; and
a backlight unit on a rear of the display unit adapted to uniformly control an amount of light transmitted from the outside and transfers the transmitted light to the display unit.

4. The vehicle display control device of claim 3, wherein the touch unit comprises indium tin oxide (ITO).

5. The vehicle display control device of claim 3, wherein the touch unit includes:
an actuator film on a rear of the cover glass; and
an adhesive member that adheres to each of one side and a second side of the actuator film to enable the cover glass to adhere to the one side of the actuator film and the display unit to adhere to the second side of the actuator film.

6. The vehicle display control device of claim 5, wherein, when a driver or a passenger presses the cover glass, a voltage is generated in the actuator film by a piezoelectric effect.

7. The vehicle display control device of claim 5, wherein an area of the adhesive member is the same as an area of the actuator film.

8. The vehicle display control device of claim 5, wherein the adhesive member comprises an optically clear adhesive (OCA).

9. A vehicle display control device comprising:
a housing comprising a body and being fixed to an instrument panel;
a liquid crystal display (LCD) cover whose outer circumference surface is spaced apart from an inner circumference surface of the housing and is within the housing;
an LCD module within the LCD cover and covered by the LCD cover;
a haptic actuator mounted on a rear of the LCD cover and adapted to transfer vibration to the LCD cover;
a support member disposed between the LCD cover and the housing; and
a sensing part mounted on each of the rear of the LCD cover and a bottom surface of the housing and adapted to sense a degree of pressurization of the LCD module.

10. The vehicle display control device of claim 9, wherein the LCD module includes:
a touch unit that selectively controls a display device through a driver's or passenger's touch; and
a display unit disposed on a rear of the touch unit adapted to receive an output signal from outside the LCD module and output various types of information,
wherein the sensing part calculates a degree of pressurization of the LCD module when a driver or a passenger presses the touch unit.

11. The vehicle display control device of claim 10, wherein the sensing part includes:
a plurality of reflecting plates mounted on the rear of the LCD cover; and
a plurality of sensor members mounted on the bottom surface of the housing and disposed at positions corresponding to the reflecting plates.

12. The vehicle display control device of claim 11, wherein the sensor members are adapted to emit infrared rays toward the reflecting plates, and the reflecting plates are adapted to reflect the infrared rays, which are emitted from the sensor members, to the sensor members.

13. The vehicle display control device of claim 11, wherein the sensing part is adapted to calculate a distance between the LCD cover on which the reflecting plates are mounted and the sensor members by calculating a time for infrared rays, emitted from the sensor members, to be reflected from the reflecting plates and return to the sensor members.

14. The vehicle display control device of claim 13, wherein, when the driver or the passenger touches the touch unit with less than a predetermined pressure, corresponding information is not output by the display unit, and when the driver or the passenger touches the touch unit with the predetermined pressure or more pressure, the corresponding information is output by the display unit.

15. The vehicle display control device of claim 11, wherein the reflecting plates have white uniform surfaces.

16. A vehicle display control device comprising:
   a housing comprising a body and being fixed to an instrument panel;
   a liquid crystal display (LCD) cover whose outer circumference surface is spaced apart from an inner circumference surface of the housing and is within the housing;
   an LCD module within the LCD cover and being covered by the LCD cover;
   a haptic actuator mounted on a rear of the LCD cover and adapted to transfer vibration to the LCD cover; and
   a support member between the LCD cover and the housing,
   wherein the LCD module includes:
      a touch unit that selectively controls a display device through a driver's or passenger's touch; and
      a display unit disposed on a rear of the touch unit and adapted to receive an output signal from outside the LCD module and output various types of information.

17. The vehicle display control device of claim 16, wherein the haptic actuator is electrically connected to the touch unit, and when the touch unit is touched, a touch signal generated from the touch unit is transferred to the haptic actuator.

18. The vehicle display control device of claim 16, wherein the haptic actuator generates vibration when a driver or a passenger touches or presses the touch unit.

19. The vehicle display control device of claim 16, wherein the support member is between the rear of the LCD cover and a bottom surface of the housing so that the LCD cover is spaced apart from the housing.

* * * * *